FIG. 6
FIG. 7
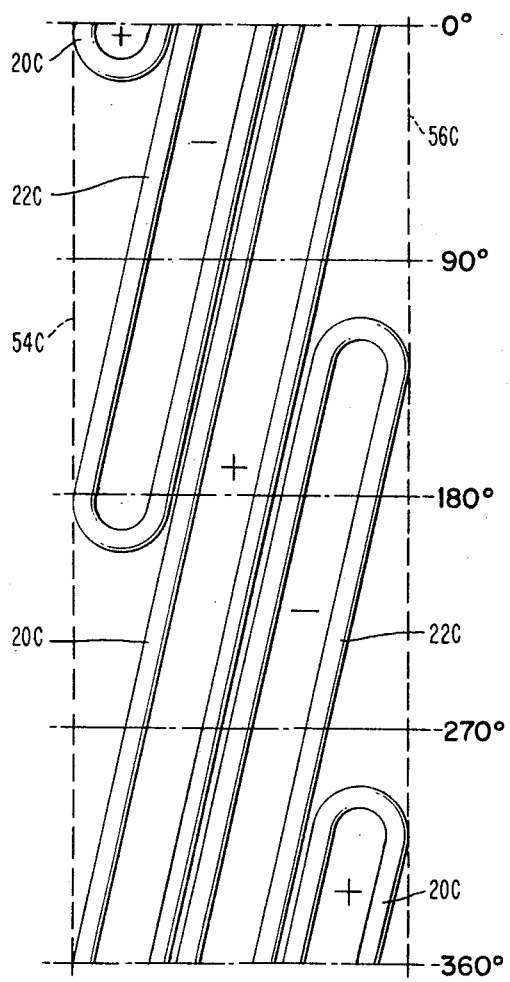
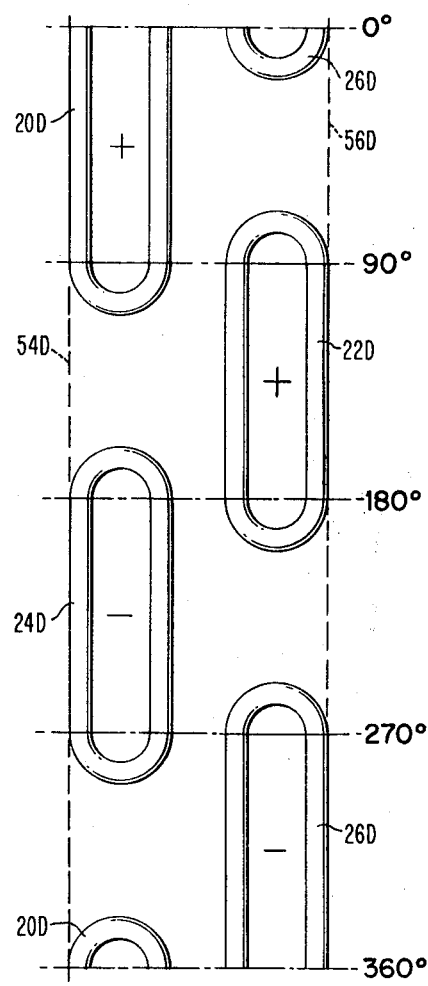

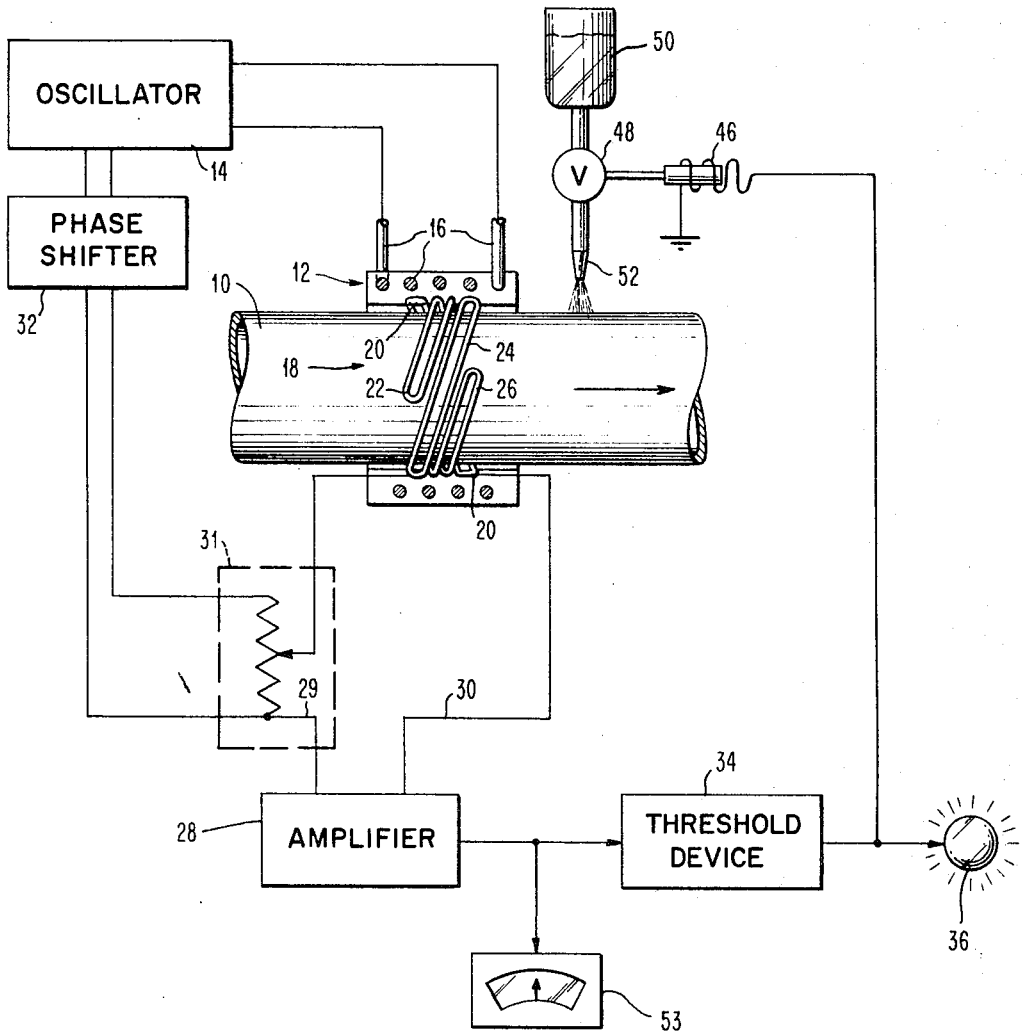
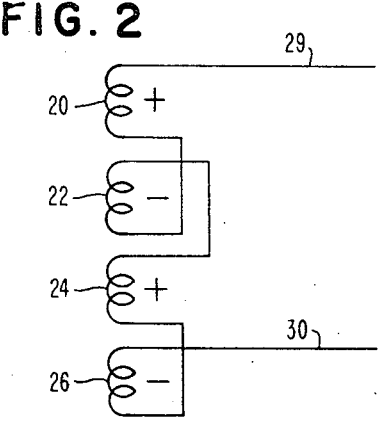

FIG. 8
FIG. 9
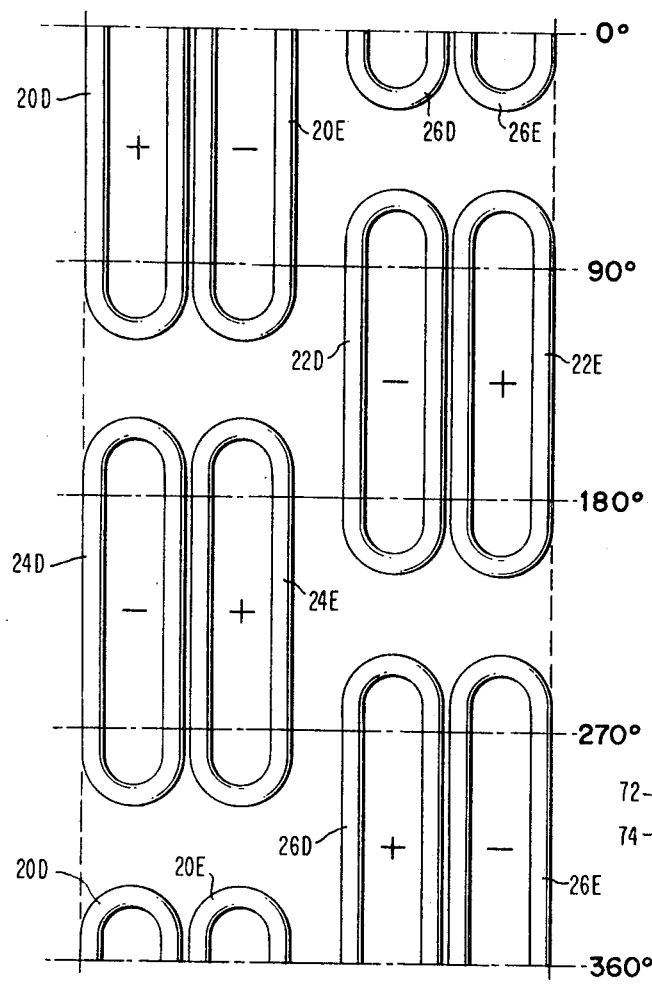
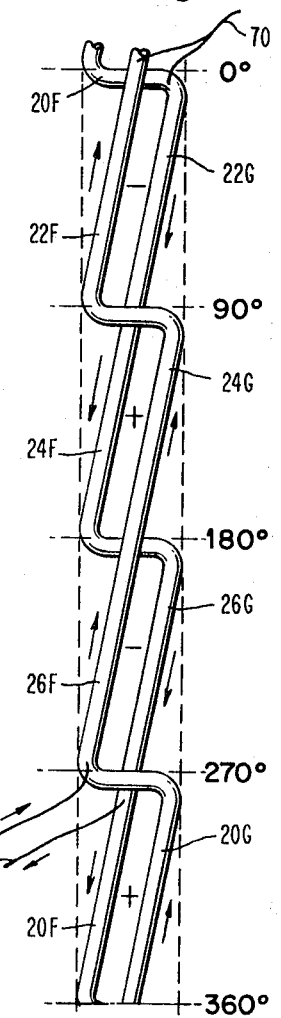

United States Patent Office 3,444,459
Patented May 13, 1969

3,444,459
EDDY CURRENT FLAW DETECTOR UTILIZING HELICAL SENSING COILS SURROUNDING THE TEST PATH
Charles Prindle, Croton-on-Hudson, and Harvey M. Feinman, New York, N.Y., assignors to Robintech Incorporated, a corporation of New York
Filed Jan. 13, 1966, Ser. No. 520,501
Int. Cl. G01r *33/14*
U.S. Cl. 324—40                    12 Claims

ABSTRACT OF THE DISCLOSURE

Apparatus for detecting flaws in a cylindrical body having at least a surface portion which is electrically conductive, including electromagnetic inductive means for providing changing magnetic fields at the surface portion while the body is axially moved through the apparatus in a cylindrical test path or circumferential zone to thereby set up eddy currents in the conductive surface. Electromagnetic sensing devices are circumferentially arranged around the test path and operable to detect flaws therein by detecting distortions of the magnetic field accompanying distortions in the eddy current patterns occasioned by such flaws. The sensing devices comprise an even number of coils arranged in an equally spaced relationship around the circumference of the test path, each of the coils being of oblong shape with the elongated portions of the coils extending helically in a band or zone around the cylindrical test path in a saddle configuration so that each turn of each coil traverses a substantial arc of the circumference of the test path. The coils are electrically connected in phase opposition to adjoining coils, and the coils form a generally uniform pattern about a circumference of the path of the body to be tested so that the coils are essentially insensitive to uniform circumferential defects while maintaining optimum sensitivity to all other types of defects.

---

Figure 3:
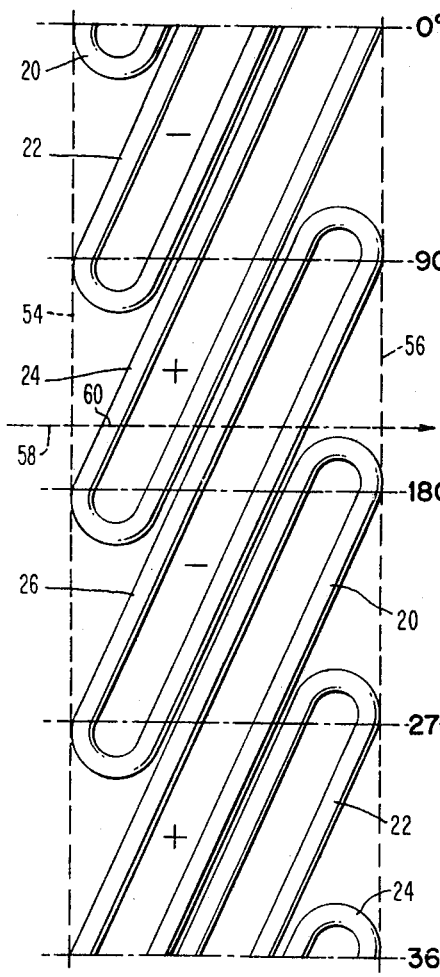

This invention relates to apparatus for detecting flaws in a cylindrical body having at least a surface portion which is electrically conductive, and more particularly to such a system which sets up eddy current patterns in the cylindrical body and then electromagnetically detects distortions of the eddy current patterns caused by flaws to be detected.

Various systems and apparatus have been proposed in the past for detecting flaws in conductive cylindrical bodies such as metal tubing. Generally, the systems referred to provide for the continuous conveyance of the metal tubing through a coil structure, and apparatus connected to the coil structure to set up eddy currents in the tubing and the detect flaws or defects in terms of non-uniformities in the eddy currents which accompany the defects.

Certain of these prior systems, as exemplified, for instance, by U.S. Patent 2,918,621—Callan, employ a pair of test coils arranged in the vicinity of the tube to be tested, the test coils being arranged in a bridge circuit so that the coils can be used both for inducing the eddy currents in the tubing, and for detecting the defects. There are various problems with such systems. One of the most serious of these problems is that the functions of inducing the eddy currents and detecting defects in terms of changes in the eddy current patterns place inconsistent requirements upon the coils. For inducing the eddy currents, it is preferable to have a coil with heavy conductors permitting the use of high currents. However, for the detection function, it is preferable to have a greater number of coil winding turns in a rather confined space, requiring fine wire. Accordingly, at least one other prior system has employed entirely separate coils or windings for these two distinct purposes. For instance, Prindle Patent, 2,971,150, discloses a system having a "primary" winding 7 of heavy conductors and separate detector coils or windings 8 and 9 for detecting changes in the eddy current patterns indicative of defects. The present invention utilized some principles taught by this prior Prindle patent.

It is an object of the present invention to provide a flaw detection apparatus which provides reliable signals in response to irregularities which make the product defective and which is relatively insensitive to irregularities which do not make the product defective for the purpose of its intended use.

The present invention is particularly useful for testing metal tubing which has been produced by a drawing process. Tubing produced by this process may be composed of various materials, but copper is one of the most common of these materials. A common irregularity in drawn tubing consists of circumferentially uniform variations in wall thickness. This is manifested by uniform circumferential rings which may appear on the outer tubing surface. This type of irregularity is not a defect because it does not appreciably weaken the wall of the tubing. This irregularity is sometimes referred to as "chatter" because the production of such an irregularity is sometimes accompanied by a chattering noise.

It is an important object of the present invention to provide flaw detection apparatus for metal tubing which does not respond to uniform circumferential irregularities such as chatter, but which is responsive to other irregularities which constitute defects.

Another object of the present invention is to provide full coverage of the circumference of the tubing for the uniform detection of defects in a single pass through a single coil assembly.

Another problem in connection with eddy current flaw detection apparatus, and particularly in such apparatus which is designed to overlook uniform circumferential defects, is that changes in balance of the detection apparatus are likely to cause spurious signals if there is any lateral shift of the path of the tubing with respect to the center of the coil assembly.

Accordingly, it is another object of the present invention to provide an improved flaw detection apparatus which is insensitive to uniform circumferential defects and which is compensated for incidental lateral displacements of the tubing with respect to the coil assembly.

Further objects and advantages of the invention will be apparent from the following description and the accompanying drawings.

In the accompanying drawings:
FIG. 1 is a schematic representation of apparatus in accordance with the present invention.
FIG. 2 is a wiring diagram illustrating the connections of the detection coils in the system of FIG. 1.
FIG. 3 is a developed view illustrating the physical arrangement of the coils of FIG. 2.
FIGS. 4 through 8 are developed views of modified physical arrangements of the pick-up coils.

Referring particularly to FIG. 1, there is shown a metal tube section 10 which is surrounded by a coil assembly indicated generally at 12 for the purpose of detecting any flaws or defects in the tubing 10 as it passes through the coil assembly. For the purpose of detecting such defects, an alternating current is supplied from an oscillator 14 to a primary winding 16 which comprises a part of the coil assembly 12. The alternating current in primary windings 16 induces circumferentially circulating eddy currents in the metal tube section 10. Positioned within the primary winding 16, and comprising another part of the coil assembly 12, there are arranged secondary or pick-up windings 18 which are arranged in separate coils, as indicated for instance at 20, 22, 24 and 26. These coils 20–26 are connected in series to provide the input to an amplifier 28 through connections 29 and 30, and a balancing device 31. The input signals to amplifier 28 represent defects in the tube 10. As will be explained more fully below, the input signals are produced in response to defects because of the modifications of the eddy current patterns occasioned by the presence of the defects.

The amplified defect signals from amplifier 28 are transmitted to a threshold device 34, the output from which provides a visual indication of the defect by means of an indicator lamp 36 and energizes the solenoid winding 46 of a solenoid valve 48 to release colored lacquer from a pressurized reservoir 50. The lacquer is released through a nozzle 52 to mark the surface of the tubing 10. This clearly locates the position of the defect which has been detected.

The output of amplifier 28 is connected to a voltmeter 53 for balancing and monitoring purposes.

All of the components of FIG. 1 which are schematically shown as boxes are of conventional construction and are not illustrated in detail here in the interest of simplicity and clarity of the disclosure.

The oscillator 14 preferably operates in the audio frequency range, that is, the range of frequencies corresponding to the frequencies of sound waves up to about 20,000 cycles per second which are audible to humans. Audio frequencies above 500 cycles per second are preferred, and a very good practical frequency of operation has been found to be about 2500 cycles per second. The secondary coils 20, 22, 24 and 26 are connected together in alternating series opposition.

FIG. 2 schematically illustrates the connections of coils 20, 22, 24, and 26. These connections taken together with the special geometry and arrangements of these coils make the entire combination of secondary windings 18 relatively insensitive to irregularities of the tubing 10 which are not considered to be defects, while at the same time providing optimum sensitivity to irregularities which are considered to be defects. This aspect of the invention will be described in more detail below. Because of the inherent balance and symmetry between the coils, half of them being connected in opposition to the other half, there is virtually zero net signal from them at the frequency of oscillator 14, in the absence of a defect. The balancing device 31 is specifically provided for the purpose of providing an absolute null balance of the windings 18 to provide essentially zero output from amplifier 28 during "no effect" conditions. The appropriate adjustment of device 31 can be made by observing meter 53. Balancing device 31 is supplied with an oscillator signal of reduced amplitude, and appropriately phase shifted, from oscillator 14 through phase shifter 32. In some instances, the balance of the windings 18 is so complete that no balance signal from device 31 is necessary. In any case, the signal from device 31 is merely a small "trimming" signal.

The threshold device 34 is provided basically to distinguish bona fide defect signals from noise signals having a lower amplitude and which may arise from various causes, but which are not indicative of tubing defects. The threshold device 34 may consist for instance of a Schmidt trigger, or other known devices which have, effectively, non-linear impedance effects such that they produce an appreciable output signal as soon as the input signal exceeds a threshold value.

The indicator 36 may be an indicator light, as shown or an audible alarm device such as a bell or buzzer, as desired. However, it is preferred to mark the tubing itself at the location of the defect so that the defective section can be removed. Any of these indicators, alarms, or appropriate marking devices, or other recording devices may be used separately, or together, as desired.

The threshold device 34 operates, in response to each defect signal, to produce an output pulse having a duration which is appropriate for the correct and efficient operation of the solenoid valve 48. The vessel 50, which contains a marking paint or lacquer, is preferably pre-pressurized. Alternatively, an air compresser may be provided to pressurize the container 50 to assure that paint or lacquer will be expelled through the valve 48 whenever it is opened.

While not shown in the drawing, two or more lacquer nozzles 52 are preferably positioned around the path of the tubing 10 and arranged for actuation together. Thus, the entire circumference of the tubing 10 is clearly marked so that any defect which has been detected cannot later be overlooked.

FIG. 3 represents a developed view of the flow-sensing pick-up coils 20–26 of the system of FIG. 1. Thus, in this view, the horizontal dotted construction lines which are labeled 0° and 90° through 360° represent various positions around the circumference of the coil assembly 12. Also, the 0° line and the 360° line actually coincide. The vertical construction lines indicated at 54 and 56 represent circumferential lines that lie in planes perpendicular to the tubing axis and which define the outer axial boundaries of the pick-up coils, and hence define an annular test zone within the confines of which zone the sensing coils are effective. The portion of the pick-up coils shown between the horizontal lines at 0° and 180° in FIG. 3 illustrate the portions of the coils which are visible in FIG. 1. Thus, only an upper tip of coil 20 is shown at the top of each of these views near the zero degree line, the remainder of coil 20 being illustrated in the region of FIG. 3 from just above the 180 degree line, and extending to the 360 degree line. When it is fully appreciated that parts of the coil 20, 22, and 24 appear at the top of FIG. 3, and other parts at the bottom, it is quite apparent that only four coils are illustrated.

The uniform arrangement of the coils between the circumference 54 and 56, taken together with the alternating series connections of the coils, as signified by the plus and minus signs at the various coils in both FIGS. 2 and 3, provides for essentially a complete insensitivity of the combination of coils to uniform circumferential defects. The expression uniform circumferential defects, as used here, signifies defects, or changes in the structure of the tubing which are substantially uniform about a particular circumference. Such defects may amount merely to changes in the thickness of the wall of the tubing, or an apparent defect signal which is occasioned by the leading edge of a length of tubing as it is first threaded through the coil assembly. These defects are sometimes referred to as "chatter" because the production of such defects in the course of the drawing of metal tubing may be accompanied by a chattering sound. The "chatter" defects are generally not harmful to the tubing since they are not accompanied by an undue weakening of the tubing wall. It is for this reason that insensitivity to these defects is desired while optimum sensitivity to other discrete defects must be maintained. The insensitivity of the coil configuration of FIG. 3 to circumferential defects is quite apparent if any circumference line of the tubing (lying in a plane perpendicular to its axis) is considered as it progresses between lines 54 and 56, with respect to the associated portions of each of the plus and minus coils 20–26. It will be observed, for each such circumference, that the circumference line intersects similar portions of an equal number of plus and minus coils. Thus, any signal occasioned by the circumferential defect in a plus coil is cancelled by an equal and opposite signal in a corresponding minus coil, and the net signal by the combination is zero.

Any non-circumferential defect of the tubing travels past the pickup coils in a path which may be represented in FIG. 3 by a horizontal line somewhere in the figure between the upper construction line at zero degrees and the lower construction line at 360 degrees. It will be observed from an inspection of FIG. 3 that any such path will traverse or intersect at least two adjacent legs of two of the coils. Thus, any such path represented by a horizontal line in the zero to 90 degree quadrant intersects the right leg of the minus coil 22, and the left leg of the plus coil 24. Similarly, any defects traveling in a path represented by a horizontal line of a quadrant from 90 degrees to 180 degrees intersects the right leg of plus coil 24 and the left leg of minus coil 26. Defects in the other quadrants provide similar signals.

A typical defect path is illustrated in FIG. 3 by the horizontal construction line 58, representing the locus of a point in the defect as it progresses relative to the sensing coils. As indicated by the arrowhead on this construction line, it is assumed that the direction of movement of the tubing, with the defect, is to the right in FIG. 3. This is consistent with FIG. 1. The defect represented by the path 58 first passes the left or leading leg of coil 24, as indicated at 60. This gives rise to what may be described as a single amplitude defect signal of positive polarity. When the defect reaches the trailing leg of coil 24, it induces defect signals almost simultaneously in the right leg of coil 24, and in the left or leading leg of coil 26, which abuts coil 24 throughout the portions in which the two coils circumferentially overlap. This combined signal may be characterized as a double amplitude signal of negative polarity. This is appropriate because it is obvious that the signal induced in the right side of coil 24 is opposite in polarity to the signal which was previously induced in the left side of coil 24 as the defect passed region 60. Furthermore, the signal induced in the left side of coil 26 is additive with respect to the signal induced in the right side of coil 24. This is true because the two sides of the two coils are opposite sides, but the coils are connected in opposition, thus making the induced signals additive. As previously mentioned above, with the configuration of FIG. 3, any defect path around the circumference of the tube will pass by or intersect a region such as to induce such a double amplitude defect signal. That is, any defect path passes one of the adjacent combinations of two coil sides. Accordingly, this provides the greatest defect signal, and the one that is normally detected by triggering the threshold device 34. As the defect following the path 58 passes the right side of coil 26, another single amplitude positive defect signal is generated in that side of coil 26 and almost simultaneously in the left side of coil 20.

The pick-up coils, taken together as a group, detect defects in terms of distortions of the eddy currents induced in the tubing because of the defect. In the paragraphs immediately preceding this paragraph, "positive" and "negative" defect signals were referred to in a conventional sense to assist in explaining the operation of the pick-up coils. However, it will be understood that the signals caused as each defect passes each side of a pick-up coil are actually in the nature of "bursts" of oscillations at the frequency of the oscillator 14, which is a frequency which is usually high enough so that a number of cycles occur as a defect passes a single coil side. It may be said therefore that these bursts of the primary oscillator frequency are modulated or gated through by the disturbance of the eddy current pattern in the tube which accompanies a defect moving axially relative to the transverse annular zone within which the pick-up coils operate.

Figure 4:
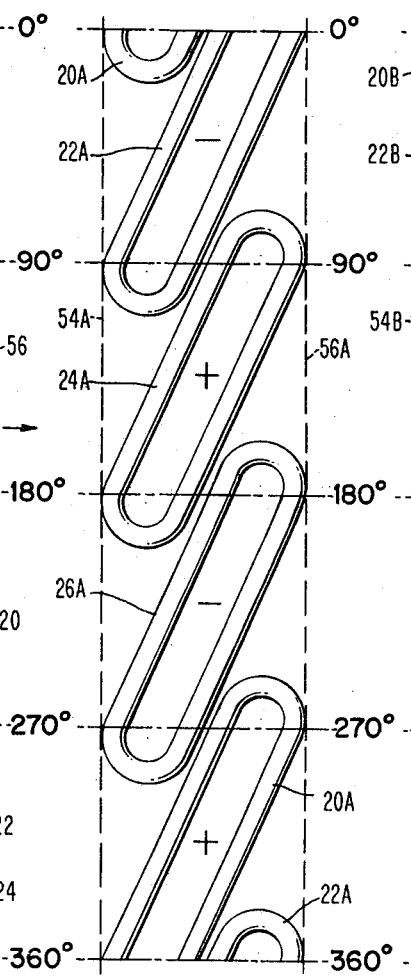

FIG. 4 is a developed view of a modified pick-up coil combination. The parts corresponding to those in FIG. 3 are correspondingly numbered with the addition of a subscript A. In this modification, each of the coils 20A, 22A, 24A and 26A spans only a little over 90 degrees of the circumference, rather than 180 degrees, as in the embodiment of FIG. 3. Thus, where the embodiment of FIG. 3 provides an overlap between each adjacent pairs of coils of at least 90 degrees, the embodiment of FIG. 4 provides only a very short overlap at the respective ends of adjacent coils. Therefore, a typical defect will pass only one single coil side at a time, inducing a single amplitude defect signal as it passes the first coil side, and an opposite polarity single amplitude defect signal as it passes the other coil side. Thus, the threshold device 34 of FIG. 1 must be responsive to a single amplitude defect signal.

The above statements about single amplitudes and double amplitudes should not be misunderstood. It is obviously possible to provide twice as many turns on each coil of the embodiment of FIG. 4, and to double the signal amplitude in that way.

Figure 5:
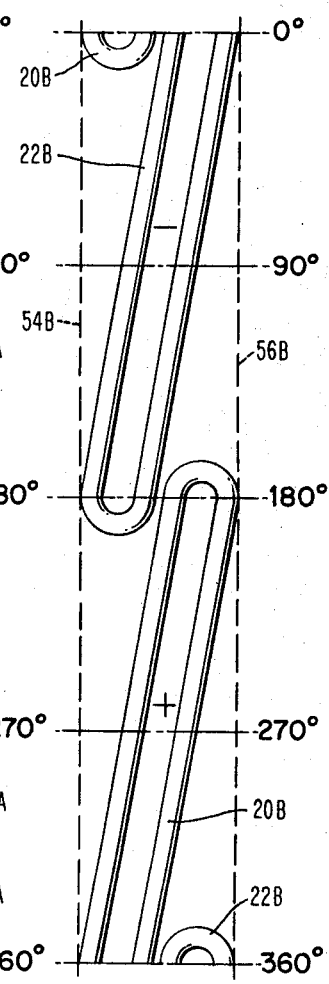

FIG. 5 illustrates a developed view of another modification of the pick-up coil combination in which the components are lettered with the suffix B. This modification employs only two coils 20B and 22B, each of which spans a little over 180 degrees, as in FIG. 3, but which have only a short space of overlap, as previously typified by FIG. 4. With this arrangement, only the two coils 20B and 22B are required to span the entire 360 degree circumference. This arrangement provides the important advantage of simplicity of construction.

FIG. 6 illustrates a developed view of another modified arrangement of pick-up coils, in which each pick-up coil spans a circumferential distance of approximately 400 degrees. Thus, each of the coils 20C and 22C surrounds the entire circumference of the test path of the tube to be tested, and actually overlaps itself by approximately 40 degrees or more. This structure is similar to that of FIG. 5 in requiring only two pick-up coils. However, this arrangement assures that the condition exhibited in the embodiment of FIG. 3 is achieved. Thus, a double amplitude defect signal is generated by every defect. However, the most important advantage of the FIG. 6 embodiment over the FIG. 5 embodiment is that it is compensated for lateral displacement whereas the FIG. 5 embodiment is not.

Each of the embodiments of FIGS. 3–6 employs a number of common features. In these embodiments, each coil has an elongated shape in which the two principal sides or legs of the coil are arranged in closely spaced essentially parallel relationship, or separated from one another by a constant distance, while being curved around the circumference of the test path in a saddle-like arrangement. Each of the coils is arranged in its elongated aspect at an angle of skew, the legs being canted with respect to the cylinder axis a circumferential line, e.g., lying in a plane perpendicular to the tubing axis, so as to assume a helical configuration similar to screw threads. This skewed arrangement, in each of the embodiments of FIGS. 3–6 is particularly effective in making the combination of coils relatively insensitive to uniform circumferential defects. This arrangement also makes the coil combination insensitive to slight axial misalignments (tilt) between the coil assembly and the tubing being tested. The advantages of the skew feature will be discussed more fully below.

FIG. 7 is a developed view of a modified pickup coil arrangement which does not employ skewed coils. In this view, the parts are numbered with the suffix letter D. This arrangement is similar to that of FIG. 4 in employing coils which each span just a little over 90 degrees of the circumference of the test path. However, in order to avoid the unwanted detection of circumferential defects, the coils 20D and 24D, which are lined up on the same circumference, must be connected in series opposition. Similarly, the coils 22D and 26D, which are aligned at approximately the same circumference, must also be connected in series opposition. Again, each coil effectively detects defects anywhere within a 90 degree span so that the four coils together are capable of detecting any defect. Since the adjacent coils such as coil 20D and 22D are not always connected in opposition, if they were spaced with opposite sides close together, the combined defect signals would essentially cancel one another out for any defect traveling in a path in the vicinity of the 90° line in this figure. In order to avoid this, these adjacent coils are axially (horizontally) spaced apart as illustrated in FIG. 7.

FIG. 8 is a developed view of another modified embodiment of the pick-up coil arrangement. The arrangement of FIG. 8 is very similar to that of FIG. 7 except that each of the coils 20D, 22D, 24D, and 26D, has been provided with an oppositely connected adjacent coil respectively indicated at 20E, 22E, 24E and 26E. These added windings are arranged in pairs at the same circumferences. Thus, coils 20E and 24E are paired with one another on essentially the same circumference while being respectively paired in side-by-side relationship with coils 20D and 24D. The embodiment of FIG. 8 involves the additional advantage that a double amplitude defect signal is available by the additive effect of the adjacent sides of the paired coils. Refer, for instance, to the right side of coil 24D and the left side of coil 24E. This is a feature which is common to the embodiments of FIGS. 3 and 6 and previously described above. The main advantage of the embodiment of FIG. 8 over that of FIG. 7 is that it is relatively insensitive to lateral shifting.

FIG. 9 is a developed view of another modified embodiment of the pickup coil arrangement. This embodiment is similar to that of FIG. 4, but it represents an interesting departure from the construction of FIG. 4. Each half turn of each coil is essentially interconnected in series with an oppositely arranged half turn of the next coil. The two sides of the uppermost coil in the developed view are respectively designated 22F and 22G. Similarly, the two sides of the next coil are designated 24F and 24G, and so forth. Each of these coil sides may include a plurality of winding turns. Each turn follows the configuration of one for a half turn and then continues to follow a half turn of the next coil. Thus, starting at the bottom of the figure, each turn of half coil 20G continues through the half coil 26F, the half coil 24G, the half coil 22F, and thus back to the half coil 20G. In this embodiment, it is apparent that the four coils 20F–20G, 22F–22G, 24F–24G, and 26F–26G are essentially formed by two circumferential windings which zig zag back and forth to form the four coils. The first winding is laid down to form the coil sides 20F, 26G, 24F, and 22G; and the second winding is then laid down to form the other coil sides 20G, 26F, 24G and 22F. The two windings may be laid down in completely separate processes, in which case, the last-mentioned combination overlays the first at each crossing. Alternatively, the two windings may be wound simultaneously so that the individual turns cross over one another at the intersections.

On first consideration, the idea of having each half turn of each coil interconnected with opposite half turns of adjacent coils, as in the embodiment of FIG. 9, might be regarded as somewhat inconsistent with the idea of four individual and discrete coils, as presented in connection with the other embodiments of this invention. However, a consideration of the electrical and magnetic effects of this configuration should make it quite clear that this structure is very closely related to the prior embodiments. The combination of coil sides, such as coil sides 24F and 24G, should be regarded as forming a single coil. For instance, these two coil sides frame an area, just as coil 24A of FIG. 4 does.

The two circumferential windings forming the individual coil sides are connected together at one end, as indicated at 70, and are brought out at the other ends to form the output connections as indicated at 72 and 74. In an actual embodiment, the output connections 72 and 74 are preferably taken off at the same point as the cross connection 70. However, they are shown at a physical separate location of FIG. 9 for purposes of clarity. In order to promote an understanding of the operation of the embodiment of FIG. 9, arrows have been placed adjacent to the output lines 72 and 74, and adjacent to each of the coil sides to indicate the direction of a typical pulse of current introduced by the detection of a defect.

Reference to the arrows at the pairs of coil sides will further advance the understanding of the appropriateness of considering the pairs of coil sides, such as 24F and 24G, as forming a coil analogous to the discrete coils of the prior embodiments. For instance, the signal current is downward in coil side 24F, and upward in coil side 24G, thus providing an essentially counterclockwise current pattern about the entire window defined by this coil. The opposite current relationship is manifested for coil sides 26F and 26G. The counterclockwise direction is indicated by the plus sign for the combination 24F–24G, and a minus sign for the clockwise current direction for the combination 26F–26G. The coils 20F–20G and 22F–22G are similarly labeled.

With this embodiment of FIG. 9, a magnetic and electrical equivalent of the embodiment of FIG. 4, is achieved, in which each coil is effectively connected in reverse series relationship to its adjacent coil, but without the problem of separately fabricating the individual coils and then interconnecting them after fabrication. Furthermore, there is a distinct advantage in the embodiment of FIG. 9 in having the adjacent coil sides such as 26F and 24G connected together in a straight and continuous unitary structure such that any tubing defect which passes adjacent to any portion of this combined continuous structure is clearly and distinctly detected. In the other embodiments, such as that of FIG. 4, it is generally regarded as necessary to provide some overlap between adjacent coils in order to assure that there is full coverage at the intersection between coils. This is not necessary with FIG. 9, though the coils lose sensitivity in the region of the cross-over wires. Accordingly, the embodiment of FIG. 9 appears to have certain advantages in ease of fabrication, it lacks some reliability in detecting flaws passing under the cross-over wires.

The coil arrangements of every one of the embodiments of FIGS. 3–9 possess the important common feature in accordance with the present invention that each coil is arranged in a saddle configuration, as briefly mentioned above. Each of these saddle-shaped coils is basically arranged with the two parallel sides of the coil at equal radial distances from the primary axis when viewed from the path of any particular defect. This feature means that there is very little induction of signals at the frequency of oscillator 14 directly from primary winding 16 to the pickup coils 20–26. However, the field induced by primary winding 16 does cause eddy currents to be generated within the tube 10 which is being tested, these eddy currents being predominantly circumferential in nature. If a defect occurs, such as a break or discontinuity in the tubing wall, or occluded foreign material of resistivity different from the tubing material, then the eddy currents are distorted and induce defect signals within the pickup coils. The elongated saddle configuration provides for pickup of each defect on each coil adjacent to the path of that defect at each elongated side of the coil. Close spacing of the two sides of each coil makes the coils very sensitive to defects having a short physical length, and to sudden discontinuities or changes which signal either the beginning or the ending of a long defect. The axial distance between the two parallel sides of each of the elongated coils (center to center) is referred to herein as the "differential span." It has been discovered that generally all irregularities of the type which are undesirable, and which should be detected as defects involve very abrupt changes. Accordingly, it is advantageous to have a short differential span between the two pickup coil sides. Not only does this improve the sensitivity of the apparatus to abrupt changes in the material being tested, but it reduces the signals of a more gradual nature which arise from gradual changes and irregularities in the character of the tubing along its length, which are not harmful and which should not be detected as defects. Thus, if the change in the tubing is gradual, both sides of the coil are influenced by such change, and since they are in opposition, the net signal is negligible. The insensitivity to harmless gradual changes in the nature of tubing 10 has been found to be particularly important with tubing composed of copper alloys, or stainless steel tubing, for instance, because it has been discovered that the observed resistivity of tubing composed of these materials is changing almost constantly as the tubing passes through the coil assembly.

The differential span cannot be reduced to virtually zero, for if the two coil sides are essentially coincident, the signals induced in them cancel one another. Stated another way, essentially no magnetic flux could link between the two coil sides. The optimum differential span is believed to be related to the following factors: (a) the size of the defect which is to be detected, and (b) the radial spacing between the surface of the tubing being tested and the pickup coils. The latter dimension is important because the magnetic field disturbance occasioned by a defect at a single point, for instance, is believed to appear to be broader at greater distances from the defect. In this respect, the magnetic field disturbance may be thought of as similar to light emanating from a point source. Accordingly, for a larger spacing of the pickup coil from the tubing surface, the differential span between coil sides should be greater.

Typical desirable specifications for the optimum differential span are as follows:

With an essentially square cross section for each leg of each coil measuring about 0.030 inch by 0.030 inch, a differential span of three thirty-seconds of an inch is used. This is a center to center dimension. The nominal radial spacing preferred between the outer surface of the tubing being tested and the center line of the coil cross section is approximately 0.035 inch. This corresponds to a spacing from the tubing to the inner surface of the winding of approximately 0.020 inch.

It should be emphasized that in order to obtain balancing between the coil sides of a single coil, and proper balancing between inter-related coils within a coil assembly, the differential span should be essentially a constant dimension, the two coil sides being essentially parallel, and each coil having the same differential span as every other coil in the coil assembly.

From the explanation immediately above, it is quite apparent that each side of each pickup coil is balanced against the opposite side of the same pickup coil so as to make each coil relatively insensitive to gradual changes in the tubing which is being tested. This is esesntially a balanced condition in a direction parallel to the motion of the tubing being tested.

In addition, at any particular circumference of the coil assembly, corresponding parts of an equal number of "positive" and "negative" connected pickup coils are arranged to tbe influenced similarly, and to be balanced against one another, so that uniform circumferential defects do not cause an output signal. Thus, for instance, in FIG. 3, coils 22 and 24 may be regarded as balanced against one another. Similarly, in FIG. 4, coils 22A, and 24A are balanced against one another for uniform circumferential defects. In FIG. 5, coils 20B and 22B are balanced against one another. In FIGS. 7 and 8, coils 20D and 24D are balanced against one another. This feature may be characterized as a circumferential balance of equal numbers of oppositely connected pickup coils.

In accordance with another important aspect of this invention, the preferred embodiments have the pickup coils balanced in such a way that essentially complete compensation is accomplished for lateral displacement between the coil assembly 12 and the tube 10 which is being tested. This is a condition where the surface of the tube may be spaced in closer proximity to the inner circumference of the coil assembly on one side than it is on the other. If during operation, either the tube 10 or the coil assembly 12 is subject to vibration of significant amplitude with respect to the other, in the absence of lateral displacement compensation, false or spurious signals are generated due to the rapid changes of balance induced by the vibrations.

Another closely-related feature of the invention is compensation for "tilt." This refers to slight axial misalignments between the tube 10 and the coil assembly 12. All of the skewed embodiments compensate for "tilt," and are preferred on this account.

The embodiment of FIG. 3 typifies a balanced pick-up coil arrangement which compensates for lateral displacement. This is accomplished by providing that the "positive" coils are displaced exactly 180 degrees from one another, and the "negative" coils likewise are displaced 180 degrees from one another. Thus, a strengthening of a signal from a circumferential defect caused by a lateral displacement towards positive coil 24, for instance, is compensated for by the accompanying condition that the tube is then spaced farther from coil 20. This lateral displacement compensation symmetry is also achieved in the embodiments of FIGS. 4 and 8. The condition requires multiples of four pick-up coils.

The lateral displacement compensation relies upon the principle that the positive and negative connected coils must be connected in an alternating sequence around the circumference of the test path, and every coil must be positioned in alignment opposite to (180° away from) a similar coil which is connected in the same sense (positive and positive, or negative and negative).

The skewed embodiments shown in FIGS. 3, 4, 5, and 6 for the pickup coils are preferred. It will be appreciated from the above description that these skewed embodiments provide inherent balanced characteristics in the circumferential dimension as well as in the axial dimension within a very short axial space. This reduces the total axial length of the coil assembly. The advantages of a short axial length for the coil assembly are discussed more fully elsewhere in this specification. The skewed embodiments of FIGS. 3 and 4 are favored pickup coil embodiments. These embodiments each provide all of the balancing features mentioned above, and additionally provide the lateral displacement compensation feature, as discussed in the paragraphs immediately preceding this one. Thus, the embodiments of FIGS. 3, 4, and 9 provide all of the compensation advantages, and balancing features, of the FIG. 8 embodiment, but they do it with much less axial length for the coil assembly, and with a smaller number of coils. Also, they compensate for tilt.

In accordance with another important feature of the invention, the coil assembly 12 is preferably constructed in a manner which provides the closest possible spacing between the pickup coils 20–26 and the other surface of the tube 10, while maintaining a workable clearance space for the tube 10 through the central bore of the coil assembly. A preferred method of fabrication for accomplishing this purpose is as follows:

The individual coils are wound and formed into the desired saddle shape. They are then interconnected in the proper alternating series sequence and positioned within a cylindrical mold. It will be understood that the "winding" and "forming" may take place simultaneously, and particularly in the embodiment of FIG. 9, the interconnections of the coils (half coils) are essentially formed simultaneously with the "winding" and "forming." A resinous organic plastic material is then cast around the pickup coils so as to thoroughly encapsulate the coils and form a single unitary cylindrical structure containing these coils. There are many known organic plastic materials which may be employed for this purpose. Included for instance, are polystyrene, polyvinyl chloride, polyethylene, polyurethane, and various epoxy resins. Some of the materials mentioned above are thermoplastic, and others are thermosetting. In order to obtain complete encapsulating and ideal physical and mechanical properties in the finished casting, a thermosetting resin material is preferred which is very liquid, and therefore very penetrating in the uncured state as it is cast. The epoxy resins have been found to be ideal for this purpose. While many different epoxy resin and crosslinking material combinations may be employed, an example of one combination of these materials which has been found very satisfactory is commercially available from the Shell Chemical Co., a subsidiary of Shell Oil Co., under the product designation "Epon 815," and using the curing agent "T-1" in the proportions recommended by the supplier.

With this method of construction, it has been found to be possible to position the pickup coils so that the windings of the coils begin virtually at the inside diameter of the coil assembly casting. Thus, there is the very closest possible coupling between the pickup coils and the adjacent surface of the tubing being tested. If desired, for possible additional protection, a very thin liner or tubing of insulating material may be cast into the coil assembly to define the inner diameter thereof. This may slightly increase the spacing, and decrease the coupling, between the pickup coils and the tubing to be tested, but with the advantage of additional protection to the pickup coils in case of accidental friction or abrasion of the inside diameter of the coil assembly.

In a typical preferred construction, in a coil assembly for checking three-eighths inch diameter tubing the skewed pickup coils of FIG. 3 may each consist of sixty turns of forty-four B. & S. gage double enameled wire. The primary winding may consist of a single layer of twenty-six B. & S. gage wire contact wound to have an axial length of approximately three-quarters of an inch and a total resistance of approximately one-tenth of an ohm. These figures are given by way of illustration only, and are not intended to limit the scope of the invention.

The initial casting which encapsulates the pickup coils 20–26 does not include the primary winding 16. The initial casting has an outside diameter corresponding to the inner diameter of the primary winding 16. Thus, this casting serves as a coil form upon which the primary winding 16 is wound. The primary winding is then temporarily cemented to the initial casting and the unfinished assembly is placed in another mold. Additional resin is then cast and cured around the primary winding to complete the coil assembly. The material for the second casting operation is preferably the same as, or similar to, the first resin material so that complete bonding and the production of a unitary structure is achieved.

Because of the self balancing features of the pickup coil combinations in the coil assemblies of the present invention, the remainder of the system, including the amplifier 28 and the subsequent apparatus in the signal channel, is considerably simpler than the corresponding apparatus of prior systems. However, if desired, the circuit of the present system may be refined and elaborated upon in order to provide even greater assurance of perfect detection of actual defects, and discrimination of such defects from non-harmful irregularities. For instance, a rectifier operated as a detector, and a low pass filter, may be connected ahead of the threshold device 34 in order to eliminate the transmission of signals at the frequency of oscillator 14, and to transmit only the lower frequency defect signals. In a practical system employing a frequency of 2,500 cycles per second for oscillator 14, a satisfactory cutoff frequency for such a low pass filter is 1,500 cycles per second.

Another useful refinement is a high pass filter having an adjustable cutoff frequency which may be inserted between the low-pass filter (if one is provided) and the threshold device 34. This device is useful because it assists in eliminating any noise signals which are of a frequency lower than true defect signals.

Another embellishment which can be added to the circuit is a phase discriminator which may be conveniently placed just after the amplifier 28. The phase discriminator must be supplied with a phase shifted signal derived from the oscillator 14, in addition to the defect signals passed through the amplifier 28. The phase discriminator provides further assurance that "chatter" (uniform circumferential defects), and other non-harmful irregularities such as dents, are overlooked.

One of the very important advantages of the completely balanced pickup coil combination in the coil assemblies of the present invention is that an extremely short primary winding is quite effective. Another factor which helps to make the employment of a short primary winding possible is the close spacing of the primary winding, and particularly the pickup coils, which is afforded in the integrally cast coil assembly.

In accordance with the present invention, it has been found that the axial length of the primary winding may be as short as approximately three times the axial length of the pickup coil assembly, whereas in prior structures it has often been necessary to provide a primary winding having an axial length in the order of ten times the axial length of the secondary or pickup windings.

It is believed to be self-evident that the invention, as shown in the drawings and described above, clearly achieves all of the desired objects and advantages.

While this invention has been shown and described in connection with a particular preferred embodiment, various alterations and modifications will occur to those skilled in the art. Accordingly, the following claims are intended to define the valid scope of this invention over the prior art and to cover all changes and modifications falling within the true spirit and valid scope of the invention.

What is claimed is:

1. A coil assembly for an eddy current flaw detection apparatus for detecting flaws in conductive tubing in terms of distortions of the magnetic field accompanying variations in the eddy current patterns caused by the flaws as said tubing is moved axially relative to said coil assembly, said assembly comprising an even number of coils equally spaced around the circumference of a test path generally coaxial with the tubing to be tested, within a zone whose boundaries lie in planes perpendicular to the axis of the test path, each of said coils being elongated with the legs thereof separated from one another by a constant distance in an axial direction while being curved in a generally circumferential path, so that all portions of the legs are substantially equally spaced radially from the axis of the test path, said coils being skewed so each coil extends diagonally across said zone with the legs of adjoining coils being in side-by-side relationship and with adjoining coils overlapping around the circumference of the test path in order to enclose the entire circumference of the test path.

2. In eddy current apparatus for detecting flaws in electrically conductive tubing traveling axially relative to a local magnetic field, a coil assembly comprising an even number of signal pickup coils, each of said coils being elongated to have two essentially parallel closely spaced coil sides, said coils each being arranged in a saddle configuration to define a circumference for a test path in the magnetic field with the two coil sides of all of said coils being substantially equally spaced from the axis of the test path throughout their length, said coils being arranged in a helical configuration with respect to the test path axis, each coil continuously abutting its adjoining coil on each side thereof with identical parts of each coil lying in a plane perpendicular to the axis of the test path, each coil being connected in series opposition to each circumferentially adjacent coil to promote insensitivity to uniform circumferential defects.

3. A coil assembly as in claim 2 in which four pickup coils are provided, and each of said coils embraces more than ninety degrees of the circumference of the test path.

4. A coil assembly in accordance with claim 3 in which each pickup coil embraces at least one hundred eighty degrees of the circumference of said test path.

5. A coil assembly in accordance with claim 2 in which at least two pickup coils are provided, each of said coils embracing and scanning over one hundred eighty degrees of said test path circumference.

6. A coil assembly as in claim 5 in which each of said coils is arranged to embrace and scan the entire test path circumference.

7. In apparatus for detecting flaws in the walls of electrically-conductive tubing wherein means are provided for causing the tubing to progress axially relative to a localized magnetic field, thereby to generate eddy currents in successively adjoining annular portions of the tubing, the improvement comprising a flaw-sensing coil assembly arranged to encircle the tubing within the magnetic field in a circumferential zone whose axial boundaries lie in planes perpendicular to the tubing axis, said assembly being responsive to distortions in the pattern of the generated eddy currents as discrete flaws in the wall of the tubing move through the magnetic field, said coil assembly comprising a plurality of coils spaced equally about said circumferential zone each of said coils having elongated parallel legs extending in a helical direction about and to subtend equal arcuate sections of said circumferential zone, and being located so that the respective ends of each coil extend between said boundaries of said zone, and so that a part of each coil circumferentially overlaps the ends of adjacent coils.

8. The improvement as claimed in claim 7 wherein said elongated legs of each coil abut the respective neighboring legs of adjacent coils throughout the regions in which the adjoining coils circumferentially overlap.

9. The improvement as claimed in claim 7 wherein said legs of each coil comprise a leading leg and a trailing leg in the direction of relative tubing axial movement, said coils being arranged so the leading leg of each coil abuts the trailing leg of the adjacent coil in the regions where said coils circumferentially overlap.

10. In apparatus for detecting flaws in the walls of electrically-conductive tubing having means for causing the tubing to progress axially relative to a localized magnetic field, to thereby generate eddy currents in successively adjoining annular portions of the tubing, the improvement comprising a flaw-sensing coil assembly arranged to encircle the tubing within the magnetic field in a circumferential zone, whose axial boundaries lie in planes perpendicular to the tubing axis, said assembly being responsive to distortions in the pattern of the generated eddy currents as discrete flaws in the wall of the tubing move through the magnetic field, said coil assembly comprising four coils spaced equally about the periphery of said zone, each of said coils having parallel elongated legs uniformly spaced apart and being curved so as to extend helically between said boundaries of said zone, said coils curving about portions of said circumferential zone in the manner of a quadruple thread.

11. The improvement as claimed in claim 10 wherein said legs comprise a leading leg and a trailing leg in the direction of relative tubing axial movement, the coil being positioned so that the leading leg of each coil abuts the trailing leg of an adjoining coil.

12. The improvement as claimed in claim 10 wherein the separation distance between said legs of each coil is short as compared to the length of said legs, to accentuate sensitivity of said assembly to changes in the signal pattern.

References Cited

UNITED STATES PATENTS

| | | | |
|---|---|---|---|
| 2,124,579 | 7/1938 | Knerr et al. | 324—40 |
| 2,746,012 | 5/1956 | Price | 324—37 |
| 2,881,387 | 4/1959 | Wood | 324—37 |
| 2,889,513 | 6/1959 | Callan et al. | 324—37 |
| 3,317,824 | 5/1967 | Wood | 324—37 |

RUDOLPH V. ROLINEC, *Primary Examiner.*

R. J. CORCORAN, *Assistant Examiner.*